United States Patent
Kim

(10) Patent No.: US 10,652,548 B2
(45) Date of Patent: May 12, 2020

(54) VIDEO SYSTEM AND METHOD WITH MINIMIZED STREAMING LATENCY

(71) Applicant: NHN Entertainment Corporation, Seongnam-si (KR)

(72) Inventor: Hye-Young Kim, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 210 days.

(21) Appl. No.: 15/015,793

(22) Filed: Feb. 4, 2016

(65) Prior Publication Data

US 2016/0234505 A1    Aug. 11, 2016

(30) Foreign Application Priority Data

Feb. 10, 2015   (KR) .......................... 10-2015-0019905

(51) Int. Cl.
| | |
|---|---|
| *H04N 19/152* | (2014.01) |
| *H04N 19/115* | (2014.01) |
| *H04N 19/40* | (2014.01) |
| *H04N 19/156* | (2014.01) |
| *H04N 19/164* | (2014.01) |

(52) U.S. Cl.
CPC ......... *H04N 19/152* (2014.11); *H04N 19/115* (2014.11); *H04N 19/40* (2014.11); *H04N 19/156* (2014.11); *H04N 19/164* (2014.11)

(58) Field of Classification Search
CPC .................................................... H04N 19/152
USPC ........................................................ 375/240
See application file for complete search history.

(56) References Cited

U.S. PATENT DOCUMENTS

| | | | |
|---|---|---|---|
| 6,438,169 B1 * | 8/2002 | Takashima | H04N 7/52 375/240.05 |
| 6,542,549 B1 * | 4/2003 | Tan | H04N 19/20 348/419.1 |
| 6,688,714 B1 * | 2/2004 | Bailleul | H04N 7/52 375/240.23 |
| 7,895,629 B1 * | 2/2011 | Shen | H04N 7/18 710/52 |

(Continued)

FOREIGN PATENT DOCUMENTS

| | | |
|---|---|---|
| JP | H08-331560 | 12/1996 |
| WO | 2008/032660 | 3/2008 |

*Primary Examiner* — William C Vaughn, Jr.
*Assistant Examiner* — Joseph Daniel A Towe
(74) *Attorney, Agent, or Firm* — H.C. Park & Associates, PLC

(57) ABSTRACT

A video system for minimizing streaming latency is disclosed. The video system includes an encoder having a data input part receiving external streaming video data, a data conversion part converting the external streaming video data to output converted video data, a first buffer receiving the converted video data, a data measurement part measuring size of the converted video data and conversion time spent for converting the streaming data, and a latency determination part comparing the size and the conversion time, respectively, to a reference size and a reference time to determine latency; and a decoder having a second buffer receiving the converted video data from the first buffer. The latency determination part transmitting the determined result to the data input part and the data input part outputs a latest streaming video data in response to determination that the first buffer or second buffer will be in underflow.

16 Claims, 3 Drawing Sheets

(56) References Cited

U.S. PATENT DOCUMENTS

| | | | |
|---|---|---|---|
| 9,516,329 B2* | 12/2016 | Schwartz | H04N 19/172 |
| 2006/0125835 A1* | 6/2006 | Sha | G09G 5/391 |
| | | | 345/560 |
| 2015/0229576 A1* | 8/2015 | Baratam | H04L 47/6215 |
| | | | 370/413 |
| 2016/0066000 A1* | 3/2016 | Cunningham | H04N 21/242 |
| | | | 725/116 |

* cited by examiner

VIDEO SYSTEM AND METHOD WITH MINIMIZED STREAMING LATENCY

CROSS REFERENCE TO RELATED APPLICATIONS

This application claims priority from and the benefit of Korean Patent Application No. 10-2015-0019905, filed on Feb. 10, 2015, which is hereby incorporated by reference for all purposes as if fully set forth herein.

BACKGROUND

Field

Exemplary embodiments relate to a video system and method for minimizing streaming latency. More particularly, exemplary embodiments relate to a video system and method for minimizing streaming latency due to underflow of a buffer of a decoder.

Discussion of the Background

Generally, video devices have a CODEC for processing video data. A video CODEC comprises an encoding part and decoding part. An encoding part performs, for example, functions of encoding, compressing and transmitting video data and a decoding part performs, for example, functions of decoding and decompressing video data to restore the original video. In such video CODEC, the encoding part and decoding part have buffers for efficient reception and transmission of video data.

FIG. 1 is a block diagram illustrating an encoder 110 and a decoder 120 of a conventional video device.

Referring to FIG. 1, a conventional encoder 110 may comprise a data input part 111, an encoding data conversion part 112, and a first buffer 113. The data input part 111 receives external streaming video data. The encoding data conversion part 112 compresses and converts the external streaming video data, and the first buffer 113 stores the converted video data and outputs, in response to request signal from external devices, the stored converted video data. Also, a conventional decoder 120 may comprise a second buffer 121, a decoding data conversion part 122, and data output part 123. The second buffer 121 receives the converted video data from the first buffer 113 of the encoder 110. The decoding data conversion part 122 converts the converted video data into streaming data, and the data output part 123 outputs the converted video data.

The conventional video system as described above may operate as follows.

First, external streaming type video data are input to the data input part 111. The encoding data conversion part 112 then compresses and converts the inputted video data. Subsequently, the converted video data are stored in the first buffer 113, and the first buffer 113 outputs the stored data in response to a request for output from an external device.

The second buffer 121 of the decoder 120 receives the converted video data output from the first buffer 113 via a network and transmits the converted video data to the decoding data conversion part 122. The decoding data conversion part 122 converts the input converted video data into streaming type video data and outputs the converted streaming type video data through the data output part 123.

The first buffer 113 of the encoder 110 and the second buffer 121 output the input data in real time. But if data output is larger than data input, the first buffer 113 or the second buffer 121 may be in an underflow state and may stop outputting data until the first buffer 113 or the second buffer 121 is filled up. Therefore, a sudden latency may occur in data output from the first buffer 113 of the encoder 110 via network and/or data input from the second buffer 121 to the decoding data conversion part 122. This may result in latency in streaming data output from the data output part 123 which may cause users watching video via a network to experience video lagging and stuttering issues.

Streaming data latency may be avoided by using encoders with a variable bitrate in real time when a buffer is in an underflow state. However, avoiding such issues with encoders having a fixed bitrate may be difficult.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments relate to a video system and method for minimizing streaming data latency caused by underflow of encoder and/or decoder buffer(s) in a fixed bitrate system.

Additional aspects will be set forth in the detailed description which follows, and, in part, will be apparent from the disclosure, or may be learned by practice of the inventive concept.

An exemplary embodiment discloses a video system including an encoder comprising a data input part configured to receive external streaming video data, a data conversion part configured to convert the external streaming video data to converted video data and to output converted video data, a first buffer configured to receive the converted video data, a data measurement part configured to measure a size of the converted video data and a conversion time spent for converting the external streaming video data, and a latency determination part configured to compare the size and the conversion time, respectively, to a reference size and a reference time to determine latency; and a decoder comprising a second buffer configured to receive the converted video data from the first buffer, wherein the latency determination part configured to determine whether the first or second buffer will be in underflow, and to transmit a determined result to the data input part, wherein the data input part is configured to output a latest streaming video data to the data conversion part in response to receiving the determined result that the first buffer or second buffer will be in underflow.

An exemplary embodiment discloses a method including receiving external streaming video data; converting the external streaming video data, by a data conversion part, to output converted video data; outputting the converted video data; measuring a size of the converted video data and a conversion time spent for converting the external streaming video data; comparing the size of the converted video data and the conversion time, respectively, to a reference size and a reference time to determine latency; determining whether a buffer will be in underflow based on a result of the comparison; and outputting a latest streaming video data to the data conversion part in response to a determination that buffer will be in underflow.

An exemplary embodiment discloses a video encoding apparatus including a data input part configured to receive external streaming video data; a data conversion part configured to convert the external streaming video data to output converted video data; a first buffer configured to receive the converted video data and output the converted video data to a second buffer of a decoder; a data measurement part configured to measure a size of the converted video data and a conversion time spent for converting the external streaming video data; and a latency determination part configured to determine latency based on a result of the measurement, wherein the latency determination part is configured to compare the size of the converted video data and the conversion time, respectively, to a reference size and a reference time, to determine whether the first or second buffer will be in underflow, and to transmit a determined result to the data input part, wherein the data input part is configured to output a latest streaming video data to the data conversion part in response to the determined result indicating that the first buffer or second buffer will be in underflow.

The foregoing general description and the following detailed description are exemplary and explanatory and are intended to provide further explanation of the claimed subject matter.

DETAILED DESCRIPTION OF THE ILLUSTRATED EMBODIMENTS

Figure 1:
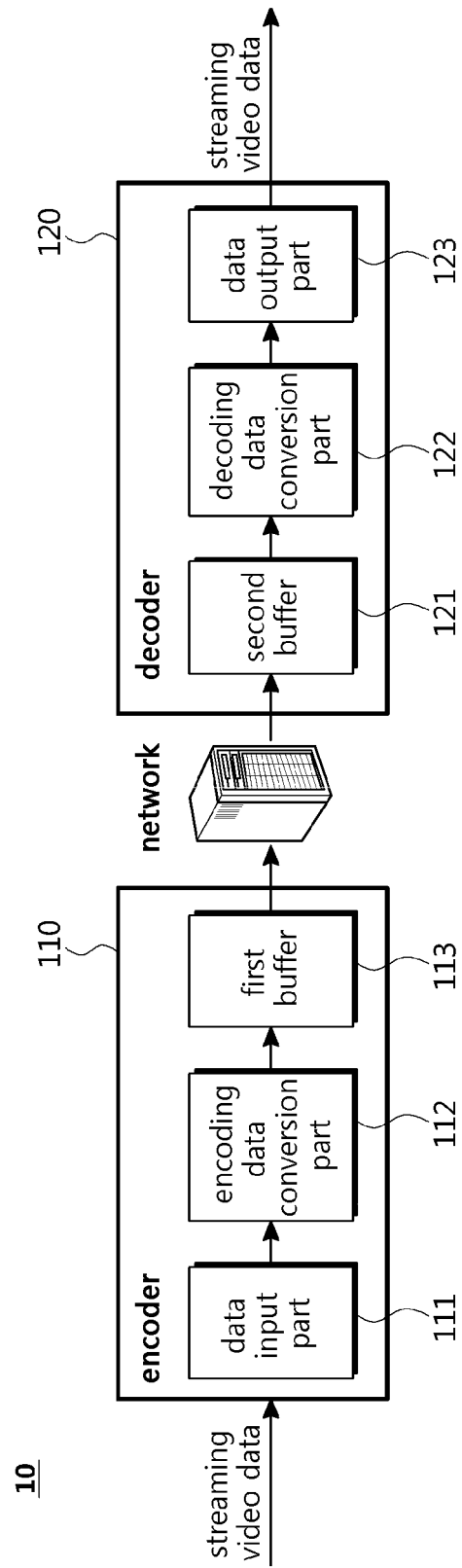
FIG. 1 is a block diagram illustrating an encoder 110 and a decoder 120 of a related video device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of regions, etc., may be exaggerated for clarity and descriptive purposes. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element or layer, there are no intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, the video system and method according to exemplary embodiments will be described in detail.

Figure 2:
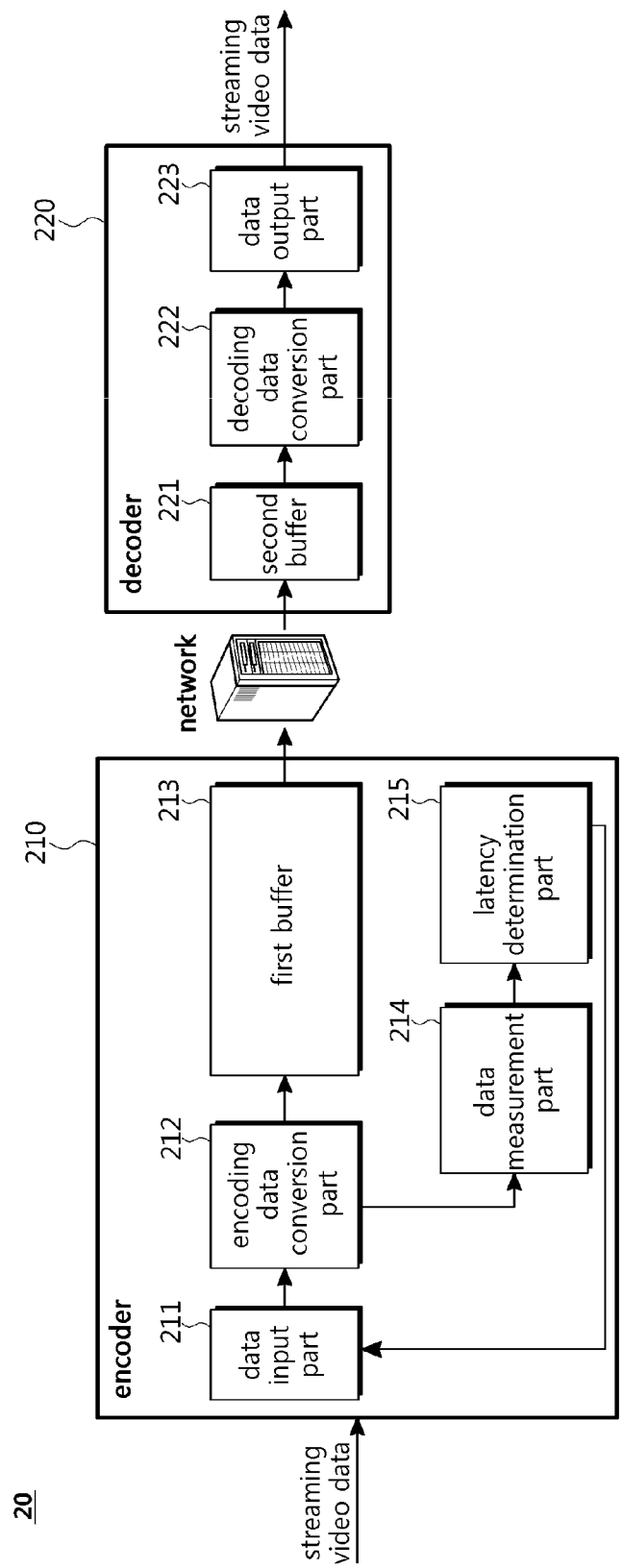
FIG. 2 is a block diagram illustrating an encoder and a decoder of video system according to an exemplary embodiment.

FIG. 2 is a block diagram illustrating an encoder and a decoder of video system according an exemplary embodiment.

Referring to FIG. 2, an exemplary embodiment of the video system for minimizing streaming latency comprises encoder 210 and decoder 220. The encoder 210 includes a data input part 211, an encoding data conversion part 212 and a first buffer 213, data measurement part 214, and latency determination part 215. The decoder 220 includes a second buffer 221, a decoding data conversion part 222, and data output part 223.

The data input part 211 receives digitalized video data in streaming form and outputs the received streaming data to encoding data conversion part 212. The data input part 211 may output the input streaming data to the encoding data conversion part 212 in a frame-by-frame method.

The encoding data conversion part 212 compresses and converts the input streaming data into converted video data, and outputs the converted video data to the first buffer 213 and the data measurement part 214. The converted video data includes encoded data of compressed bit strings. The encoding data conversion part 212 may be, for example, a Moving Picture Experts Group ("MPEG") encoder encoding video and audio signals where bitrate of the MPEG encoder may be constant.

The first buffer 213 outputs the converted video data to the decoder 220 via a network.

The converted video data is transmitted from the encoding data conversion part 212 to the data measurement part 214. The data measurement part 214 measures a size of the converted video data and conversion time spent for converting the streaming data. The size of the converted video data may depend on the type of video frame and the conversion time may depend on the size of the converted video data.

More specifically, an MPEG encoder may not compress every video frame into separate pictures but may use the fact that there are many similarities between neighboring video frames. For example, in a scene of a movie where a car moves along a lateral direction without a change in the background, data compression may be performed only for the moving car to reduce the amount of video data because pixel data of the background remains unchanged during some video frames. In other words, motion estimation may be performed using prediction and interpolation so that higher compression efficiency may be achieved. However, MPEG video requires video frames that can be restored by its own information without information of other video frames to be inserted regularly. Such video frames are compressed into normal pictures. There are several different types of video frames in an MPEG video. For example, an I-frame (or I-picture) is a compressed picture that can be decoded independently of any other frames, a P-frame, namely, a forward-predicted frame, is a video frame that stores only the difference in image from the frame immediately preceding it by exploiting the redundancy over time in a video, and a B-frame, namely, a backwards-predicted frame, is a video frame that is similar to a P-frame, except a B-frame may make predictions using both the previous and future frames. An MPEG video displays a complete video by arranging the above-mentioned types of video frames under specific rules. Because the data compression is performed as described above, a size of the converted video frame data and conversion time spent for data conversion may depend upon the background and the objects of each picture.

The latency determination part 215 receives the data size and conversion time from the data measurement part 214, and compares the data size and the conversion time, respectively, to a reference size and a reference time to determine whether underflow will occur. If the conversion time is shorter than the reference time, or if the size is smaller than the reference size, the latency determination part 215 determines that underflow will occur and transmits the determined result to the data input part 211.

In an exemplary embodiment, the reference size and the reference time may be, for example, 20,000 bytes and 8 ms, respectively. In this exemplary embodiment, the latency determination part 215 may determine that an underflow will occur if the measured size of the converted video data is smaller than 20,000 bytes and/or the measured conversion time is shorter than 8 ms.

In response to a signal of an underflow occurrence being transmitted from the latency determination part 215 to the data input part 211, the data input part 211 may again output the latest streaming data to the encoding data conversion part 212.

The encoding data conversion part 212 outputs the external streaming video data in a frame-by-frame method and receives the latest video frame again to convert the same video frame again if the converted video data does not meet the reference data size or the reference conversion time, i.e., if the converted video data size is smaller than the reference size or is converted within the reference conversion time.

The second buffer 221 of the decoder 220 receives a data of bit strings output from the encoder 210. The decoding data conversion part 222 converts the input data of bit strings to output data to the data output part 223. The decoding data conversion part 222 may be an MPEG decoder decoding video and audio signals. The data converted by the decoding data conversion part 222 are output by the data output part 223 to provide users with a streaming type of video data in a frame-by-frame method.

According to an exemplary embodiment described above, underflow that may occur in the encoder 210 or decoder 220 can be prevented to reduce video lagging.

Figure 3:
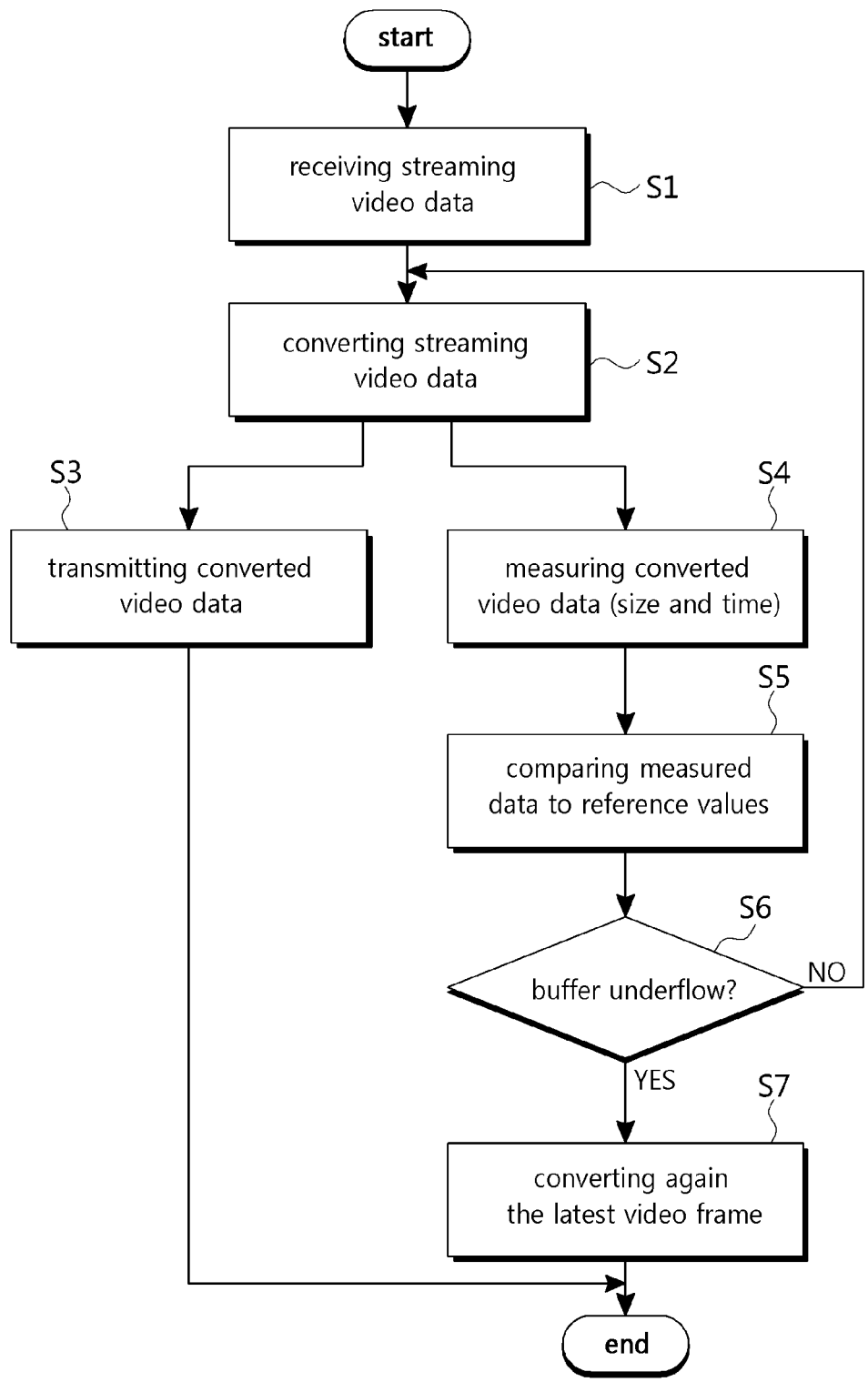
FIG. 3 is a flow chart illustrating a method for minimizing streaming latency according to an exemplary embodiment.

FIG. 3 is a flow chart illustrating a method for minimizing streaming latency according to an exemplary embodiment.

Referring to FIG. 3, an exemplary embodiment of a method for minimizing streaming latency comprises receiving external streaming video data S1, converting the external streaming video data to output converted video data S2, outputting the converted video data S3, measuring size of the converted video data and conversion time spent for converting the streaming data S4, comparing the size and the conversion time, respectively, to a reference size and a reference time to determine latency S5, determining whether a buffer will be in underflow based on a result of the comparison S6, and outputting again the latest streaming data to the encoding data conversion part 212 in response to the determination that buffer will be in underflow S7. In the receiving external streaming video data S1, the data input part 211 of the encoder 210 receives digitalized video data in a frame-by-frame way.

In determining whether a buffer will be in underflow based on a result of the comparison S6, the buffer may be at least one of a first buffer 213 of the encoder 210 or a second buffer 221 of the decoder 220.

The step of converting the external streaming video data to output converted video data S2 may be performed by an MPEG encoder encoding video and audio signals. The MPEG encoder may have a fixed output rate.

In the comparing the size and the conversion time, respectively, to a reference size and a reference time to determine latency S5, the reference size may be, for example, 20,000 bytes and the reference conversion time may be 8 ms. If the size of the converted video data is smaller than 20,000 bytes and/or the measured conversion time is shorter than 8 ms, the latency determination part 215 determines the buffer will be in underflow.

An exemplary embodiment of a video encoding apparatus or encoder 210 according to the present invention may comprise a data input part 211 receiving external streaming video data, an encoding data conversion part 212 converting the external streaming video data to output converted video data, a first buffer 213 receiving the converted video data and outputting the converted video data to a second buffer 221 of a decoder 220, a data measurement part 214 measuring size of the converted video data and conversion time spent for converting the streaming data, and a latency determination part 215 determining latency based on a result of the measurement.

The latency determination part 215 compares the size and the conversion time, respectively, to a reference size and a reference time to determine whether the first or second buffer will be in underflow, and transmits the determined result to the data input part 211.

The data input part 211 outputs to the encoding data conversion part 212 again the latest streaming data in response to that the first of second buffer will be in underflow.

The data input part 211 outputs to the encoding data conversion part 212 the external streaming video data in a frame-by-frame method. Herein, the latest streaming data is the latest video frame.

In an exemplary embodiment, the reference size and the reference time may be, for example, 20,000 bytes and 8 ms respectively. In this exemplary embodiment, the latency determination part 215 determines underflow if the measured size of the converted video data is smaller than 20,000 bytes or the measured conversion time is shorter than 8 ms.

According to the exemplary embodiments described above, buffer underflow that may occur in encoder 210 or decoder 220 may be prevented to reduce video lagging.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A fixed bitrate video system for minimizing streaming latency comprising:
a fixed bitrate encoder assembly comprising a data input part configured to receive external streaming video data, an encoding data conversion part configured to convert the external streaming video data to converted video data and to output converted video data, a first buffer configured to receive the converted video data, a data measurement part configured to measure a size of the converted video data and a conversion time spent for converting the external streaming video data, and a latency determination part configured to compare the size and the conversion time, respectively, to a reference size and a reference time to determine latency; and
a decoder assembly comprising a second buffer configured to receive the converted video data from the first buffer,
wherein the latency determination part is configured to determine whether the first buffer will be in underflow, and to transmit a determined result to the data input part,
wherein the data input part is configured to repeat output of a latest frame of the streaming video data to the encoding data conversion part in response to receiving the determined result that the first buffer will be in underflow, and
wherein the encoding data conversion part is configured to repeat conversion of the latest frame into the video data so as to output the converted video data at a fixed bitrate.

2. The video system of claim 1, wherein the data input part is configured to output the external streaming video data in a frame-by-frame method to the encoding data conversion part, wherein the latest streaming video data is a latest video frame.

3. The video system of claim 1, wherein the reference time is 8 ms, and the latency determination part is configured to determine that the first buffer will be in underflow if the conversion time is shorter than 8 ms.

4. The video system of claim 1, the reference size is 20,000 bytes, and the latency determination part is configured to determine that the first buffer will be in underflow if the size of the converted video data is smaller than 20,000 bytes.

5. The video system of claim 1, wherein the encoding data conversion part comprises a Moving Picture Experts Group (MPEG) encoder having a constant bitrate.

6. A method for minimizing streaming latency in an encoder assembly comprising a fixed bitrate system, the method comprising:
receiving external streaming video data;
converting the external streaming video data at a fixed bitrate, by an encoding data conversion part, to output converted video data;
outputting the converted video data;
measuring a size of the converted video data and a conversion time spent for converting the external streaming video data;
comparing the size of the converted video data and the conversion time, respectively, to a reference size and a reference time to determine latency;
determining whether a buffer will be in underflow based on a result of the comparison;
repeating output of a latest frame of the streaming video data to the encoding data conversion part in response to a determination that buffer will be in underflow; and
repeating, in response to receiving the repeated latest frame, conversion of the latest frame into the video data so as to output the converted video data at a fixed bitrate.

7. The method of claim 6, wherein the external streaming video data is output in a frame-by-frame method to the encoding data conversion part, the latest streaming video data being a latest video frame.

8. The method of claim 6, the buffer is at least one of a first buffer of an encoder assembly outputting the converted video data and a second buffer of a decoder receiving the converted video data from the encoder assembly.

9. The method of claim 6, wherein the encoding data conversion part is a Moving Picture Experts Group (MPEG) encoder having a constant bitrate.

10. The method of claim 6, wherein the reference time is 8 ms, and the comparing step determines the buffer will be in underflow if the conversion time is shorter than 8 ms.

11. The method of claim 6, wherein the reference size is 20,000 bytes, and the comparing step determines the buffer will be in underflow if the size of the converted video data is smaller than 20,000 bytes.

12. A fixed bitrate video encoding system comprising:
a data input part configured to receive external streaming video data;
an encoding data conversion part configured to convert the external streaming video data to output converted video data at a fixed bitrate;
a first buffer configured to receive the converted video data and output the converted video data to a second buffer of a decoder;
a data measurement part configured to measure a size of the converted video data and a conversion time spent for converting the external streaming video data; and
a latency determination part configured to determine latency based on a result of the measurement,
wherein the latency determination part is configured to compare the size of the converted video data and the conversion time, respectively, to a reference size and a reference time, to determine whether the first buffer will be in underflow, and to transmit a determined result to the data input part,
wherein the data input part is configured to repeat output of a latest frame of the streaming video data to the encoding data conversion part in response to the determined result indicating that the first buffer will be in underflow, and
wherein the encoding data conversion part is configured to repeat conversion of the latest frame into the video data so as to output the converted video data at a fixed bitrate.

13. The video encoding system of claim 12, wherein the data input part is configured to output the external streaming video data in a frame-by-frame method to the encoding data conversion part, the latest streaming video data being a latest video frame.

14. The video encoding system of claim 12, wherein the reference time is 8 ms, and the latency determination part is configured to determine that the first buffer will be in underflow if the conversion time is shorter than 8 ms.

15. The video encoding system of claim 12, wherein the reference size is 20,000 bytes, and the latency determination part is configured to determine that the first buffer will be in underflow if the size is smaller than 20,000 bytes.

16. The video encoding system of claim 12, wherein the encoding data conversion part is a Moving Picture Experts Group (MPEG) encoder having a constant bitrate.

* * * * *